US007028056B1

(12) United States Patent
Hendel et al.

(10) Patent No.: US 7,028,056 B1
(45) Date of Patent: Apr. 11, 2006

(54) METHOD AND ARRANGEMENTS FOR GENERATING DEBUGGING INFORMATION FOLLOWING SOFTWARE FAILURES

(75) Inventors: Matthew D. Hendel, Seattle, WA (US); Kent Forschmiedt, Shoreline, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/549,814

(22) Filed: Apr. 14, 2000

(51) Int. Cl.
*G06F 17/30* (2006.01)

(52) U.S. Cl. .................... 707/202; 707/204; 707/206

(58) Field of Classification Search ............ 707/202, 707/204, 205, 206, 1, 200; 714/45, 4, 15
See application file for complete search history.

(56) References Cited

U.S. PATENT DOCUMENTS

| 5,603,033 | A  | * | 2/1997  | Joannin ............... 717/124 |
| 6,430,707 | B1 | * | 8/2002  | Matthews et al. ......... 714/37 |
| 6,601,188 | B1 | * | 7/2003  | Wilding ............... 714/15 |
| 6,615,364 | B1 | * | 9/2003  | Nagasuka et al. ......... 714/5 |
| 6,633,876 | B1 | * | 10/2003 | Heatlie .............. 707/10 |
| 6,681,348 | B1 | * | 1/2004  | Vachon .............. 714/45 |
| 6,898,737 | B1 | * | 5/2005  | Goeller et al. .......... 714/39 |
| 6,952,793 | B1 | * | 10/2005 | Nagasuka et al. ......... 714/5 |

OTHER PUBLICATIONS

Ancona et al. Implementing the essence of reflection: a reflective run-time environment, Proceeding of the 2004 ACM symposium on Applied computing, pp. 1503-1507.*

* cited by examiner

*Primary Examiner*—Jean M. Corrielus
*Assistant Examiner*—Baoquoc N. To
(74) *Attorney, Agent, or Firm*—Lee & Hayes, PLLC (57) ABSTRACT

Methods and arrangements are provided that substantially reduce the requisite amount of data required to conduct postmortem analysis following a computer failure. The methods and arrangements can be advantageously configured to allow for rapid online user support for a variety of users, computing devices, operating systems, applications, and the like. One method includes determining when to generate a dump file, and generating a dump file by gathering thread, callstack and thread context information for the running thread, process identifying information associated with the running thread, and information identifying the reason for generating the dump file. The resulting dump file is then stored to a storage medium and accessed during subsequent analysis. The dump file can be a kernel minidump file that is associated with an operating system program failure, in which case the running thread is the single thread that was running when the failure occurred. The kernel minidump file would include the kernel callstack and the process identifying information that would identify the process that initiated the single thread. The method is further applicable to non-operating system programs, wherein a user minidump file is generated by also gathering callstack information for all running threads, thread context information for all running threads, and a listing of all loaded modules for the faulting non-operating system program.

56 Claims, 6 Drawing Sheets

|  | Excel | Outlook | IE |
|---|---|---|---|
| Number of threads | 10 | 14 | 12 |
| Largest Stack size in KB | 2 | 2 | 8 |
| Total Stack Size in KB | 5 | 5 | 17 |
| Number of Modules | 56 | 79 | 82 |
| Size of Mini-dump File in KB | 38 | 50 | 61 |

METHOD AND ARRANGEMENTS FOR GENERATING DEBUGGING INFORMATION FOLLOWING SOFTWARE FAILURES

TECHNICAL FIELD

This invention relates to computers and software, and more particularly to methods and arrangements for efficiently generating debugging information following a software failure.

BACKGROUND OF THE INVENTION

Computer failures can generally be traced to either hardware or software problems. This Background section discusses those failures that can be identified through a careful examination of the data stored by the computer at the time of failure.

When an operating system or application program crashes it is useful, if possible, to save information about the reasons for the crash and the state of the system when it crashed for later reference. Conventional techniques for collecting such POSTMORTEM INFORMATION (or DUMP INFORMATION) require an enormous amount of data be stored. For example, when an operating system (OS) crashes, the common technique of collecting postmortem information is to save the entire contents of the computer's RAM to permanent storage (e.g., disk, tape, floppy, etc.).

As computer's memory sizes and the amount of data associated with the OS continues to increase, the time it takes to store this postmortem information upon failure is correspondingly increased. Indeed, many users simply don't have time to generate postmortem information, and instead opt to manually reboot the computer, losing all postmortem debugging data. Consequently, problems may or may not be reported, and those that are reported would lack the critical data necessary to debug the problem. This means that a random, yet commonly occurring problem may not get the attention required. For example, consider the effort required to generate a complete postmortem debug information file for a large file server with 64 gigabytes of system memory. It would likely take the system many hours to store all of this postmortem information, if enough disk space could even be found to store it on. And if data was finally stored to memory, it would very difficult to move later. Even with very fast networks, it would require hours to copy a 64 GB file over a network connection. Even a conventional personal computer (PC) having only 64 megabytes of system memory could still take an inordinate amount of time to complete a full postmortem dump.

To avoid such delays, some operating systems are configured to output only that portion of the system memory that is allocated for use by the operating system kernel. While this tends to reduce the amount of data generated, even the resulting postmortem dump file is quite large. For example, when configured to save only the kernel portion of the system memory, the postmortem files for the Microsoft Windows 2000 kernel range in size from 32 megabytes to 8 gigabytes in size. For reference, a 32-megabyte file would take about 3 hours to transfer over a 28.8K Baud modem connection.

This same problem occurs with non-operating system programs, also called user-mode programs. As with OS components, the main problem with user-mode post-mortem debug data is that it is typically quite large and it takes a long time to generate. User-mode dump files for Windows 2000 are typically 50 to 100 megabytes in size. As we discussed above, with files this large is it very difficult to transmit files of this size back to the computer or operating system vendor for analysis.

Consequently, the above stated problems and conventional solutions hamper the desire of many users and manufacturers for improved online support of the OS and applications. Here, for example, it would be unacceptable and potentially expensive for a user having a 28.8K Baud modem to transmit a 64 MB memory dump file to the manufacturer for postmortem analysis (it would take more than 5 hours).

As such, there is a need for improved methods and arrangements that substantially reduce the requisite amount of data required to conduct a significant postmortem analysis following an operating system or application failure. Preferably, the methods and arrangements will be advantageously configured to allow for online user support for a variety of users, computing devices, operating systems, applications, and the like.

SUMMARY OF THE INVENTION

Improved methods and arrangements are provided that substantially reduce the requisite amount of data required to conduct postmortem analysis following an operating system or application failure. The methods and arrangements can be advantageously configured to allow for rapid online user support for a variety of users, computing devices, operating systems, applications, and the like. The methods can be applied to either operating system failures or application program failures.

The various methods and arrangements address the generation of failure information when failures occur at either the operating system level (KERNEL-MODE) or in traditional user program (USER-MODE). For example, when a failure occurs to a program executing in USER-MODE a USER-MODE MINIDUMP or USER MINIDUMP can be generated. Similarly, when a failure occurs in kernel-mode a KERNEL-MODE MINIDUMP or KERNEL MINIDUMP can be generated.

The above stated needs and others are met by a method that includes determining when to generate a dump file, and generating a dump file by gathering the thread, thread context and callstack for the thread that caused the failure; also included in the dump are the process containing the failing thread and the reason for the crash (e.g., invalid memory reference). The resulting dump file can then be stored to a storage medium and accessed for subsequent analysis. In certain implementations the dump file also includes information about multiple threads, multiple processes or portions of data for the failing process. When configured as a kernel minidump, the list of device drivers for the system is included.

To further support a kernel minidump, the method may also include allocating a buffer space in memory during an initialization process, and reserving space on a storage medium drive suitable for writing the contents of the buffer. The method then includes generating the kernel minidump file by initially storing the list of device drivers, crashing process and thread, as well as the thread-context for the thread and the callstack associated with the thread. Additionally, the kernel minidump contains information identifying the reason for generating the crash. The method further includes copying the kernel memory dump file from the buffer space to the storage medium as a kernel minidump. In still other implementations, the method includes, upon re-initialization, accessing the kernel minidump on the storage medium and using at least a portion of it to further understand the failure that occurred.

The method is also applicable to non-operating system programs. Here, for example, a user minidump file is generated by gathering the following information at the time of a failure: the list of threads running at the time of the crash; the thread-context and callstack for each running thread; the list of modules loaded at the time of the crash; the reason for the crash; and, selected regions of the process's memory that relate to the cause of the crash.

The above stated needs and others are met by an arrangement having a system coupled to memory and at least one data storage device. The operating system is configured to determine when to generate a dump file while running computer instructions, and generate the dump file in the memory by gathering callstack information for at least one running thread, thread context information about the at least one running thread, process identifying information associated with the at least one running thread, and information identifying the reason for generating the dump file.

Methods for use in communicating between a client process and a server process in a distributed processing system are also provided. Here, for example, the methods can be used to provide application-programming interfaces (APIs) or like capability when writing and reading dump files.

For a write dump operation, such methods include having the client process issue a write dump file call having a plurality of call parameters including a process handle, a process identifier, a handle to a file where dump file information is to be written, and a dump type identifier. The server process receives this write dump file call and parses the call to retrieve the parameters, and then in response, issues a write dump file call acknowledgment providing a true-false indication.

For a read dump operation, such methods include having the client process issue a read dump file call having a plurality of call parameters including a header of a dump file and a data type identifier of data to read from a dump file, having the server process receiving the read dump file call and parsing the call to retrieve the parameters, and then having the server process issue a read dump file call acknowledgment providing a true-false indication and a plurality of call return parameters including a pointer to a beginning of a dump stream, and a stream size identifying the size of the dump stream. The plurality of call return parameters may also include a pointer to a dump file directory.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
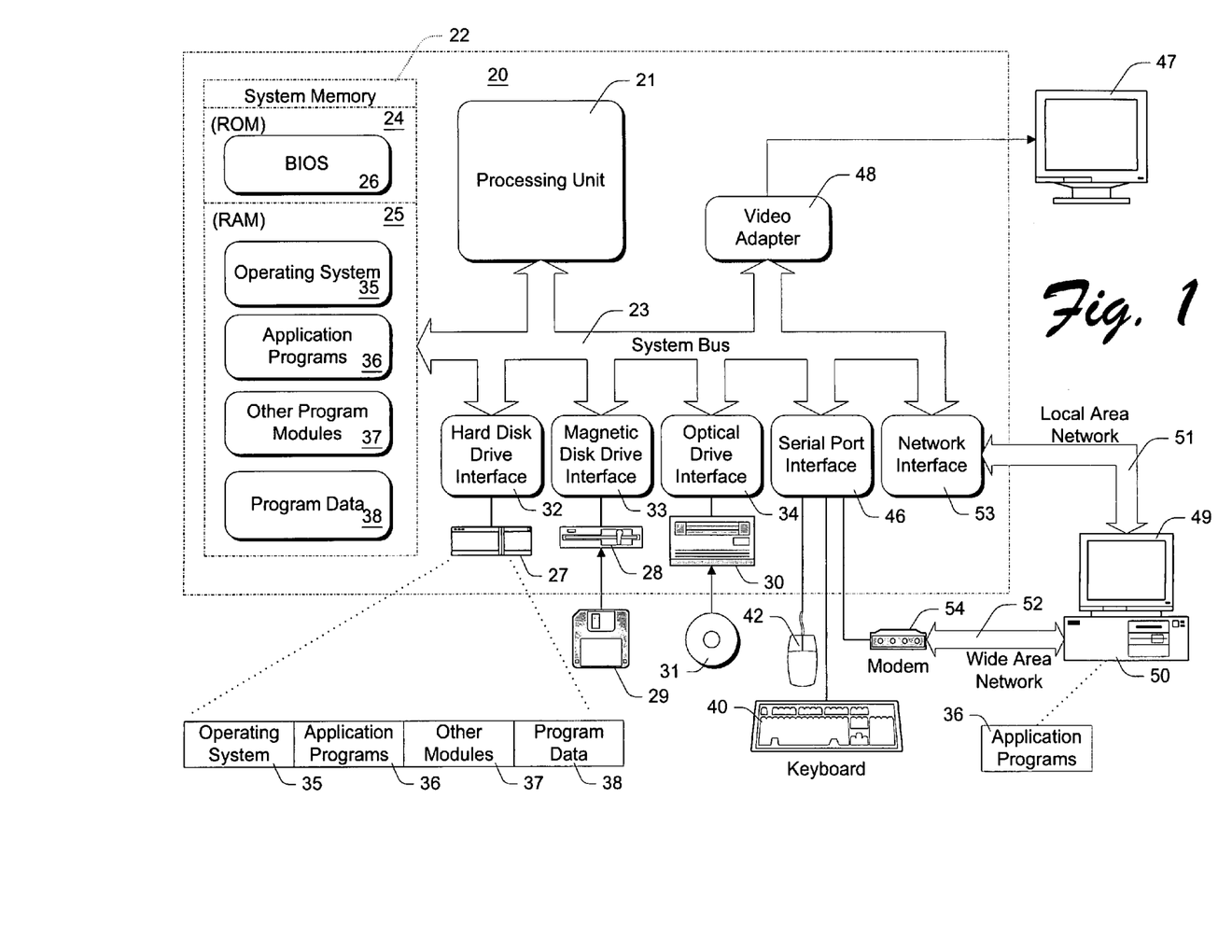
FIG. 1 is a block diagram depicting an exemplary computer system suitable for use in generating a dump file.

As shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 156. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 6:
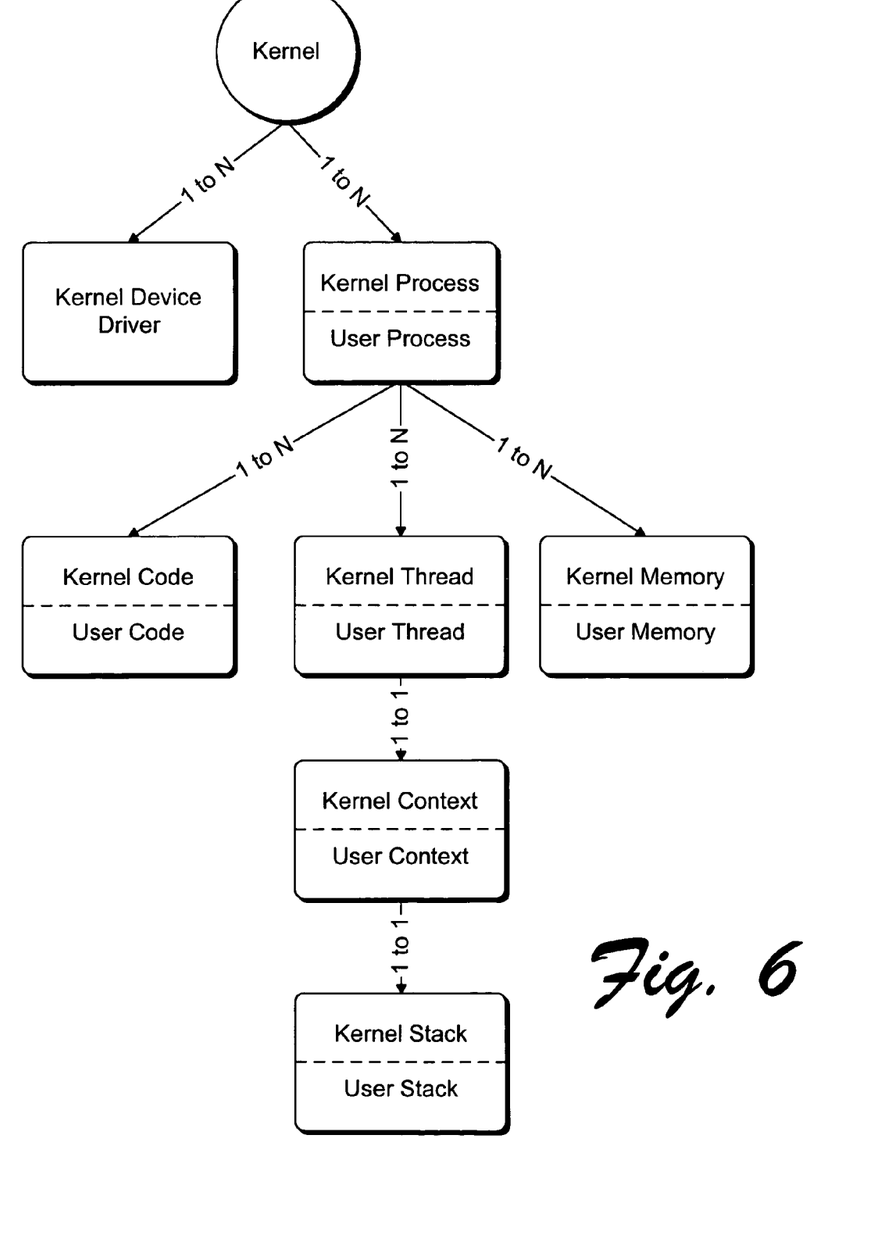
FIG. 6 is a block diagram depicting features of an exemplary operating system suitable for use in a user-mode minidump process or a kernel-mode minidump process.

FIG. 6 depicts a simplified model of an Operating System. At the top of the diagram is the operating system's KERNEL. The kernel runs it's own code and the code from any number of KERNEL DEVICE DRIVERS. Note that the arrow connecting the kernel to the device drivers is labeled "1 to N". This means that there can be many device drivers for every kernel. The kernel runs any number of PROCESSES. Each process contains a kernel portion and user portion. The kernel portion of a process is accessible only by the kernel and it's device drivers. The user portion is to both the user-mode process and kernel-mode portion of the process.

The process's code is executed either by the kernel (KERNEL CODE) or by the process itself (USER CODE). Processes can accomplish several tasks at once. Each of these tasks is a THREAD. A thread, like a process, contains both a user-mode portion, and a private kernel-mode portion. Each thread contains one THREAD CONTEXT. A thread context specifies exactly what a thread is doing at any specific moment. The thread context contains one CALLSTACK. Thus, there is a kernel-mode only callstack and a user-mode callstack.

Figure 2:
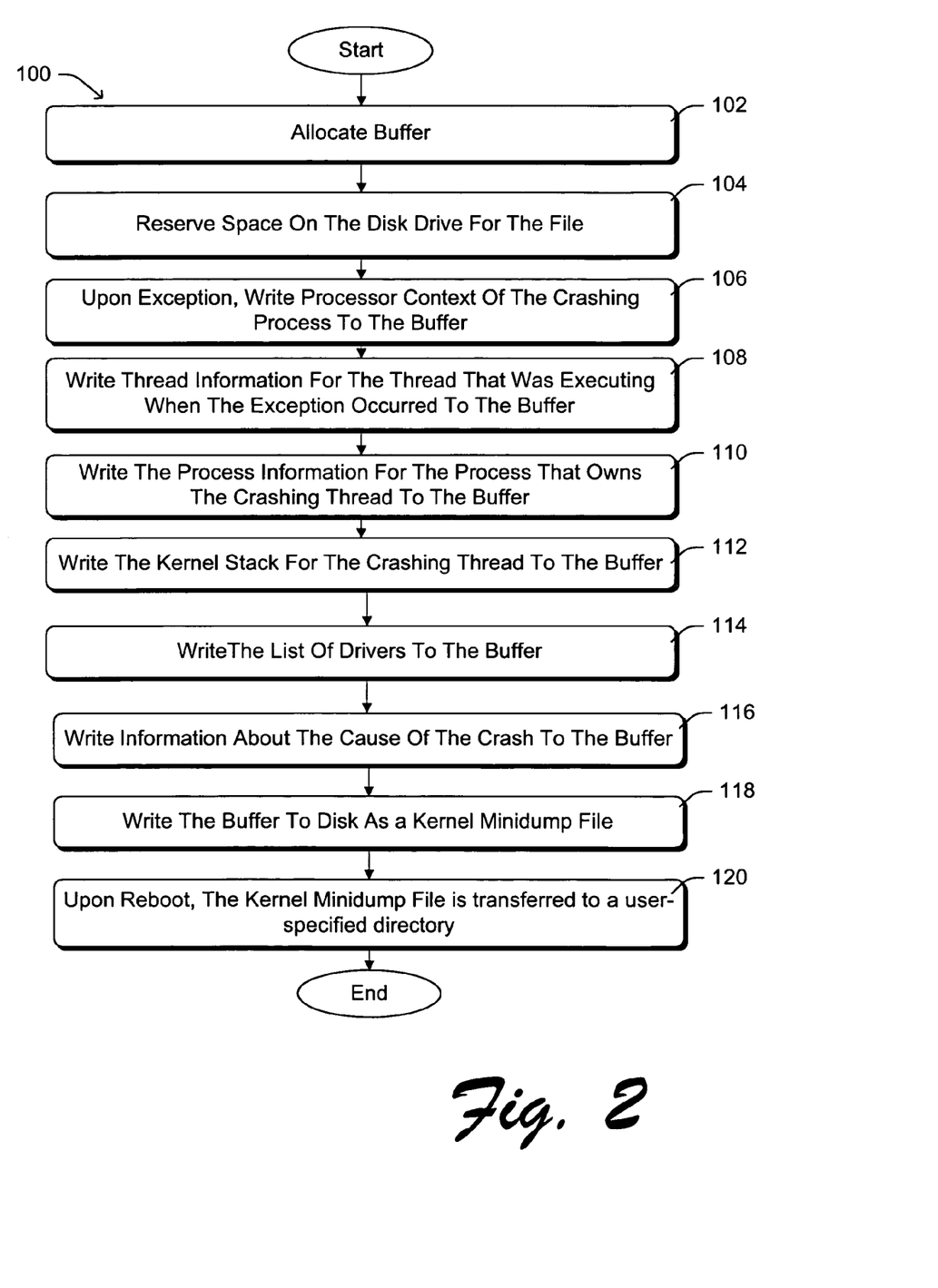
FIG. 2 is a flow-chart depicting a kernel minidump process for use in generating postmortem debug information of an operating sytem failure as might be experienced from time to time in the computer system of FIG. 1.

A flow-chart depicting an exemplary kernel-mode minidump process 100 for use in generating data suitable for conducting a postmortem analysis of a computer failure is provided in FIG. 2.

As discussed below, kernel-mode minidump process 100 generates a very compact representation of the running system information in the event of a system failure. The resulting kernel minidump file is capable of being created and written to disk very quickly, as well as quickly transported, for example, via e-mail over the Internet or other communication resource. Despite its relatively small size, the kernel minidump file contains enough information to allow a developer or product support engineer to significantly reproduce the computing environment and otherwise debug the faulting driver or operating system failure.

One advantage of kernel minidump process 100 is that it is capable of directly addressing the reliability and stability of the operating system, since all system failures can be logged and sent to the manufacturer for analysis. Thus, for example, as a result of kernel minidump process 100, both device driver developers and operating system developers can easily diagnose and quickly respond to user issues that usually only occur in the field. Furthermore, since the resulting kernel minidump file is significantly compact enough it can also be added to a database of problems requiring further analysis or comparison.

In addition to traditional operating systems, it should be noted that kernel minidump process 100 is also a particularly desirable feature for enterprise-level operating systems, especially those operating systems that use a large number of third party drivers or have high reliability requirements.

Unlike previous solutions, kernel minidump process 100 is preferably designed to generate as minimal amount of information as necessary to meaningfully debug the failure. Thus, in accordance with certain exemplary implementations, kernel minidump process 100 generates a kernel minidump file essentially containing the processor information for the crashing processor, the thread for the crashing process, the process information for the crashing process, the callstack for the crashing thread, a list of device drivers loaded at the time of the crash including the location within the system where they are loaded and the version of the device that was loaded, and the specific cause for the crash.

In this example, kernel minidump process 100 does not store the actual code (i.e., executable instructions) for the running operating system or any of the loaded drivers. Instead, kernel minidump process 100 stores version information about the operating system and each driver that was loaded, and the virtual address where the driver was loaded. Then, during the subsequent analysis/debugging stage, the analyst can locate the proper driver version and load it into memory for debugging purposes at that time.

By not saving code, therefore, kernel minidump process 100 is able to generate a much more compact kernel minidump file. By way of example, in certain exemplary implementations the kernel minidump file for Microsoft® Windows® 2000 is only 64 KB, still contains sufficient information to locate the crashing driver, generate a symbolic callstack for the driver and locate the source code line and file where the driver failed.

In accordance with still further features, a user may also access certain local variables and information about the cause of the crash. These may be helpful to online or telephone support personnel or processes.

In step 102 of FIG. 2, at initialization/boot time, a kernel minidump buffer capable of holding the required kernel minidump information is allocated along with a kernel minidump file that is large enough to hold the kernel minidump information. For example, in the Windows® 2000 example, the kernel minidump file is allocated from the paging file. Also in step 102, a list of raw disk sectors that form the kernel minidump file is obtained.

Next, in step 104 space for the disk drivers is reserved on the disk drive where the kernel minidump file will be stored.

In step 106, when the computer system fails, the processor context of the crashing processor is gathered from the system and written to the kernel minidump buffer. In step 108, the thread information for the thread that was executing when the failure occurred is gathered from the system and written to the kernel minidump buffer. Similarly, in step 110, the process information for the process that owns the crashing thread (above) is gathered from the system and written to the kernel minidump buffer.

In step 112, the kernel stack for the crashing thread is gathered from the system and written to the kernel minidump buffer.

In Step 114 the list of kernel-mode components, such as, the kernel, device drivers and hardware abstraction layers (HALs) that were loaded when the computer failure occurred and their respective load-addresses and appropriate version information (e.g., a checksum, timestamp, and image size) is gathered from the system and written to the kernel minidump buffer.

In step 116, specific information about the cause of the crash is gathered from the system and also written to the kernel minidump buffer. In Windows® 2000, for example, this information is provided as the BugCheckCode along with the four BugCheck words associated with the failure.

In step 118, the kernel minidump information from steps 106 through 116 transferred or otherwise copied from the kernel minidump buffer to disk. Since the file system is never invoked, faults in the file-system can be caught. In certain implementations, the resulting kernel minidump information is stored in an indexed table.

Next, in step 120, when the computer system is rebooted, the kernel minidump file is transferred from it's temporary location, where it was written to by fault-handling code in step 118, to a more permanent location, for example, in a user-specified directory containing a list of kernel minidump files. These files can then be accessed, forwarded or otherwise handled as necessary to study the failure.

Those skilled in the art will recognize that the various steps in kernel minidump process 100 can be rearranged or reconfigured in many ways, as required to meet the needs of a given computing system environment.

One of the interesting aspects about the resulting kernel minidump file is what information can be left out. Thus, in the example above, no code for running components is saved (i.e., executable instructions), no dynamically allocated memory is saved, and no initialized or uninitialized data is saved. Also, no information about threads, processes or processors except the crashing thread, process and processor is saved in the example above. While certain information may be necessary for other implementations, in the above example (FIG. 2) this appears to significantly minimize the amount of information required.

Kernel minidump process 100 is essentially directed towards system crashes. Thus, there remains a need for similar processes for non-system failures, i.e., user application failures.

Conventional postmortem debug information collection techniques tend to store all user-accessible memory for an application, including code for all user-mode shared libraries, dynamically allocated memory, and all stack data, upon the occurrence of a failure. This produces very large dump files, of which only a portion may be required to subsequently analyze the failure.

Figure 3:
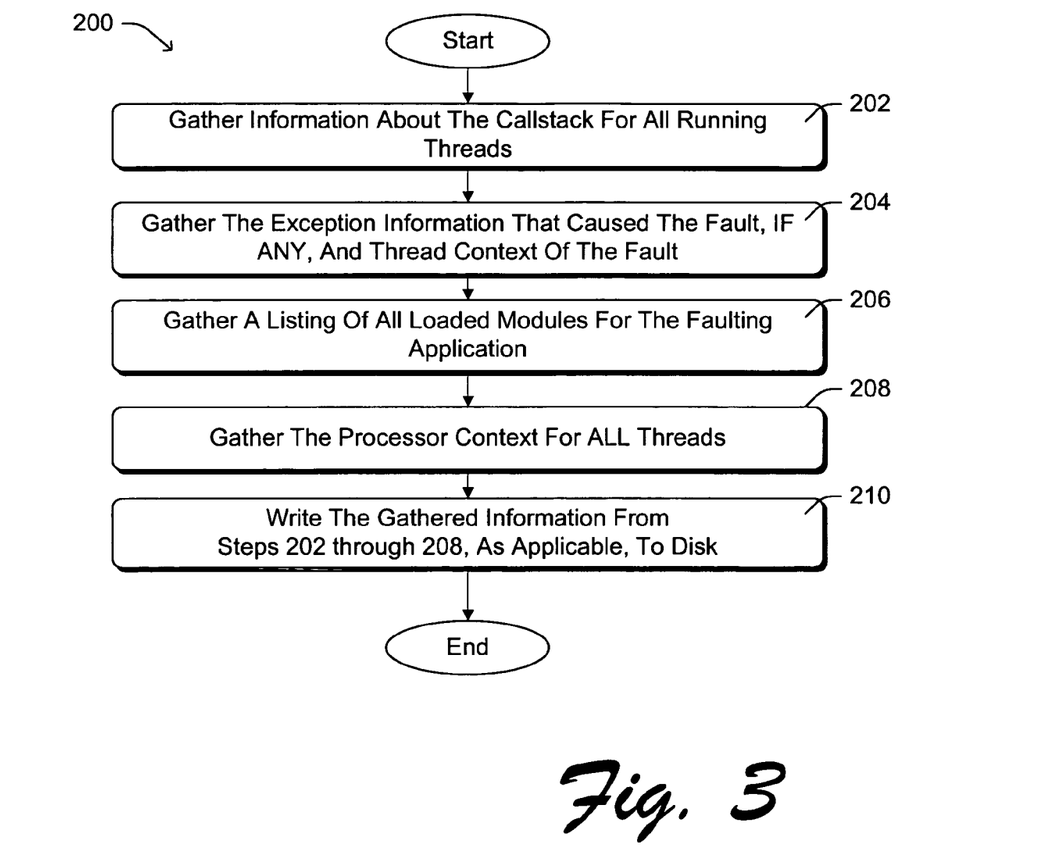
FIG. 3 is a flow-chart depicting a user minidump process for use in generating user postmortem debug information of a computer application failure, for example, as might be experienced from time to time in the computer system of FIG. 1.

With this in mind, FIG. 3 depicts a user minidump process 200 for use in generating significantly smaller user-mode dump files containing selected information that is suitable for conducting postmortem analysis of an application failure.

In step 202, user minidump process 200 gathers information about the callstack for all running threads. In step 204, the exception information that caused the fault, if any, and thread context of the fault is gathered. A list of all loaded modules for the faulting application is gathered in step 206. In step 208, the processor context for all threads is gathered. In some configurations of minidump process 200, additional information about the crash is also saved at this point. In step 210 the results of steps 202 through 208 are written to disk.

In accordance with certain implementations, for example, user minidump process 200 does not require instrumentation of the application, hooking of system application programming interface (API) calls, or either local or remote symbolic information to be available. Instead, the resulting user minidump file can be generated by the client application simply using only information readily available through standard debugging APIs, such as, for example, Win32 APIs.

The current implementation of the Dr. Watson tool in Windows® 2000, for example, saves data for the entire process's address space. While this tends to guarantee full postmortem analysis of the application, huge dump files are often created (e.g., 50 MB or more).

In contrast, using user minidump process 200, in the event that Microsoft® Internet Explorer (IE) crashes, instead of a Dr. Watson dialog coming up, IE can itself catch the error and write a user minidump file to disk. Since the user minidump file size is relatively small (about 60 KB for IE), it takes only a second or two to write the user minidump file to disk. When IE restarts, it could then note that a user minidump file was written. Here, for example, IE may then access a remote bug database that identifies that the problem experienced was a bug that has since been fixed in a Service Pack release of IE. The user could then be prompted to upgrade IE to fix the problem. In another illustrative scenario, assume Microsoft® Excel crashes on a user's machine. As with the IE scenario, with user minidump process 200 Excel can catch the exception and write a user minidump file to disk. Here, the user may be notified that there was a program error and that the use minidump file should be mailed to the developer. The minidump file can then be e-mailed to developer where it can be forwarded to the development team responsible for the code in Excel. Using standard debugging tools like Visual Studio, the development team is able to walk the callstack, view parameters to functions, view local variables, and view the exact line and file where the failure occurred. Using this information the development team will likely be able to fix an obscure program error that otherwise would not have been reproducible.

In certain implementations of Windows® 2000, for example, two additional functions in the form of APIs are added to the DBGHELP system DLL. The first API is a write user minidump API (WriteMiniDump), and the second API is a read user minidump API (ReadMiniDump). These functions are configured to allow an arbitrary application to write and read a user minidump file. Experiments suggest that a user minidump file of approximately 100 KB would be able to walk the callstack of all threads, read any active local variables, view parameters to functions, and view source code for the faulting application. Moreover, existing user-mode debugging tools, such as, Visual Studio and the like, can be easily debug a user minidump file. Furthermore, since the user minidump file format is completely specified and public, various developers can write custom applications to process the user minidump file as necessary.

Figure 4:
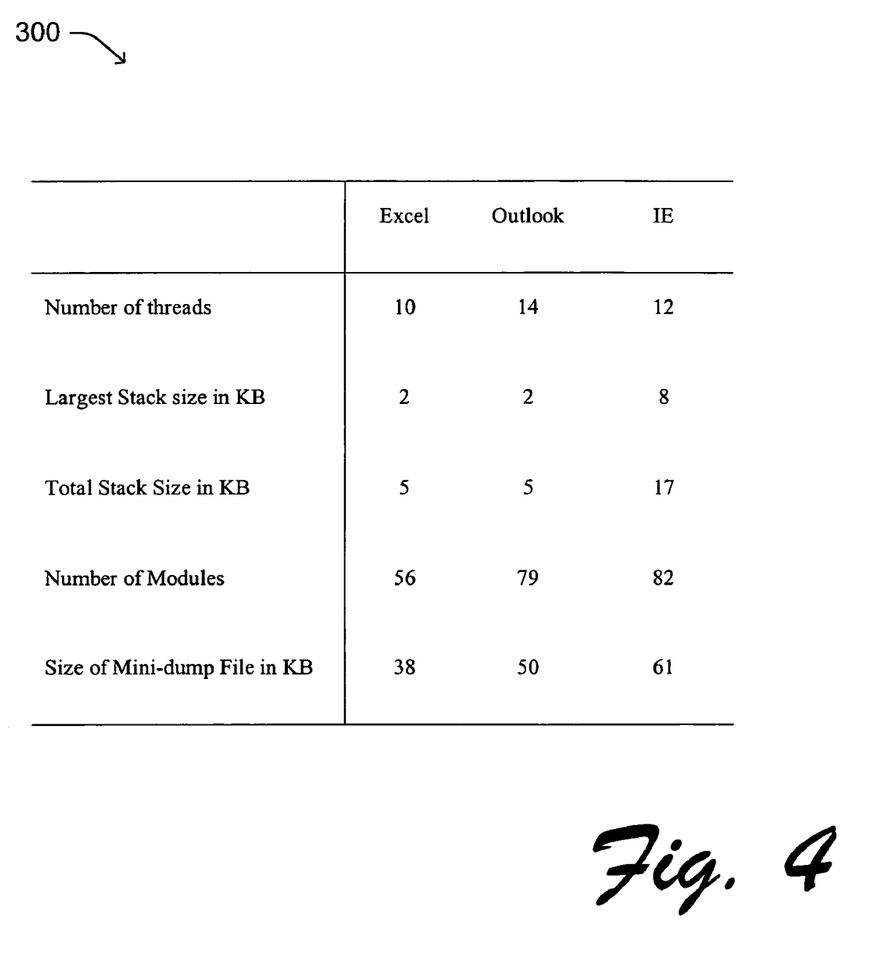
FIG. 4 is a table depicting experimental results for user minidump files associated with different applications, as generated, for example, using the user minidump process of FIG. 3.

FIG. 4 is a table 300 listing experimental results associated with user minidump process 200 as applied to certain applications during a failure. Here, user minidump files were created for Microsoft® Excel 2000, Outlook® 2000 and IE 5.0, using an x86 PC. As can be seen, the size of the resulting user minidump files for each of these applications is fairly small, ranging from 38 KB to 61 KB. Consequently, such user minidump files can be quickly saved and easily transported.

As shown in greater detail below, in certain implementations two system API calls have been added to DBGHELP of Windows® 2000, one to write a user minidump file and one to read a user minidump file. Any application, including postmortem tools, debuggers or the application itself will be able to write a user minidump file at any time. In this manner, an application is explicitly allowed to write a user minidump file even when there is not an exception or failure.

```
BOOL
WINAPI
WriteMiniDump(
    IN HANDLE hProcess,
    IN DWORD ProcessId,
    IN HANDLE hFile,
    IN MINIDUMP_TYPE DumpType,
    IN PMINIDUMP_EXCEPTION_INFORMATION ExceptionParam,
    IN PMINIDUMP_USER_STREAM_INFORMATION UserStream,
    IN PMINIDUMP_CALLBACK_INFORMATION CallbackParam
    );
```

The WriteMiniDump API writes a user-mode minidump to the file specified by hFile. The parameter hProcess is a process handle with full read and query permissions. ProcessId is a process identifier for the process. The hFile parameter is a handle to a file where the user minidump information is written. DumpType is used to identify the type of dump to generate. In other words, different types of minidumps supporting different feature sets can be supported. The ExceptionParam is an optional pointer to a structure describing the exception in the client that caused the mini-dump to be generated. If this parameter is NULL, no exception information will be written to the minidump file. The UserStream is an optional pointer to an array of USER_DATA_ENTRY structures. A user data entry is optional user information that is written to the dump file. The content of the user information is arbitrary and is never interpreted by the WriteMiniDump routine. UserStream should be NULL if there is no optional user information. CallbackParam is an optional pointer to a user minidump callback data pointer and routine that WriteMiniDump can callback with extended information about the dump. The callback allows the caller of WriteMiniDump to completely control the granularity of information written to a user minidump file. If this pointer is NULL, no callbacks are performed.

The return values of the WriteMiniDump API are TRUE (1) upon success, and FALSE (0) upon failure.

The ReadMiniDump API is:

```
BOOL
WINAPI
ReadMinidumpStream (
    IN PVOID BaseOfDump,
    IN ULONG StreamNumber,
    OUT PMINIDUMP_DIRECTORY * Dir, OPTIONAL
    OUT PVOID * StreamPointer, OPTIONAL
    OUT ULONG * StreamSize OPTIONAL
    );
```

The ReadMiniDump API reads a field from a user-mode minidump. Since the user minidump file specification is well defined (e.g., see FIG. 5 below) the ReadMiniDump API can be considered strictly a convenience.

Here, BaseOfDump is the header of the mapped user minidump file, StreamNumber is the type of data to read from the mini-dump file, and Dir, on return, contains a pointer to the user minidump directory of type DataType file format. StreamPointer, on return, contains a pointer to the beginning of the mini-dump stream of type DataType. The type of data that this points to depends on the type of data requested in the DataType parameter. StreamSize, on return, contains the size of the stream.

The return values of the ReadMiniDump API are simply; TRUE (1) upon success, and FALSE (0) upon failure.

Figure 5:
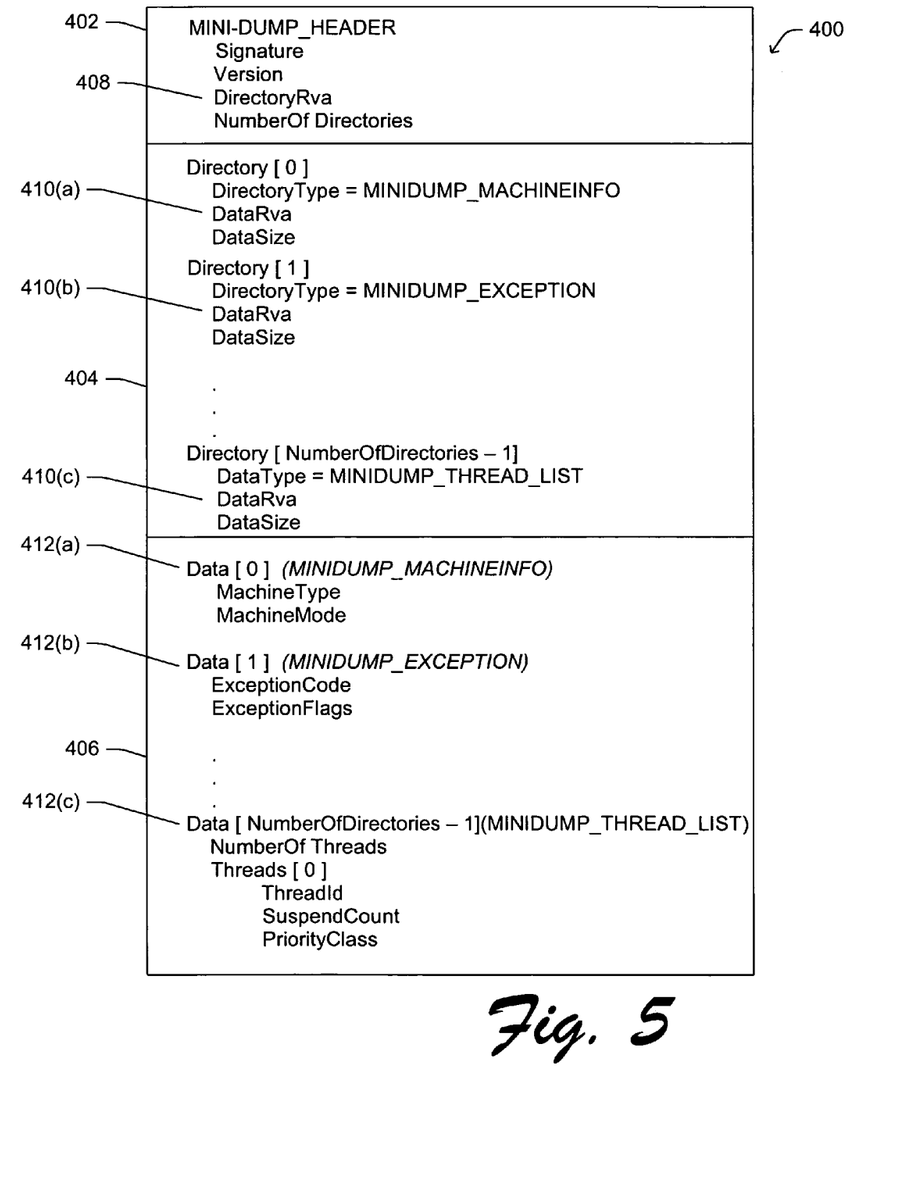
FIG. 5 is an illustrative representation of an exemplary user-mode minidump file having a plurality of directories, for example, as generated using the user-mode minidump process of FIG. 3.

With this exemplary implementation in mind, a format for a user minidump file will now be described with reference to FIG. 5. The user minidump file 400 includes a header section 402, a directory section 404 and a data section 406. These sections are indexed using RELATIVE VIRTUAL ADDRESSES (RVAs), which describe the location of a data member within a file. An RVA is an offset from the beginning of a file. In FIG. 5, RVA 408 points to the first directory in section 404, and RVAs 410(a–c) point to respective data 412(a–c) in section 406.

Since it is important for a user minidump file from one computer architecture to be readable on a computer of a different architecture, all structures in user minidump file 400 are therefore of the same size, regardless of the computer system they are generated on.

As shown in FIG. 5, the user minidump file format is similar to the Portable Executable image file format in that it specifies a set of directories that then point to the data (e.g., see *Microsoft Portable Executable Common Object File Format Specification Revision* 6.0: Visual C++ Business Unit, Microsoft Corporation, February 1999). Each directory entry in section 404 specifies the data type, the size of the data and an RVA 410 to where in the user minidump file 400 the data is located. In this example, only one directory of a specific type is allowed per file.

Those skilled in the art will recognize that the above described methods and arrangements are flexible in that a variety of operating systems and applications can be supported. The amount of resulting kernel minidump information or user minidump information can be increased or decreased as needed. For example, in certain implementations, the user minidump file can be reduced even further to only include the faulting thread, faulting thread's callstack and context, module list, and reason for the crash. This can further reduce the user minidump file to several dozen bytes.

Additionally, in certain implementations, information can be added to the user minidump file to make it more usable by debuggers. One limitation of the user minidump process as described above is that it does not store any global variables or dynamically allocated memory. If needed, however, global variables could be saved by adding global data from the faulting process or, more sophisticatedly, by adding only selected regions of global data. These selected regions of global data can be selected by a custom-written application that has knowledge about where certain data is stored in the specific application. Also, selected data pages from the process could also be stored as needed to view active heap variables. The user minidump file format of FIG. 5 has the built-in flexibility to add these data while maintaining compatibility with previous versions.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

The invention claimed is:

1. A method for generating a dump file the method comprising:
   a. generating a minidump files that does not include all volatile system memory containing at least:
      i. thread information for at least one running thread, ii. context information for the thread,
iii. callstack information for the thread,
iv. processing information for a process in which the thread is running, and
v. information identifying a reason comprising one of the following reasons: callstack fault, processor fault, and application program fault, for generating the minidump file;
b. storing the minidump file to a storage medium;
c. allocating a buffer space in memory during an initialization process, wherein the buffer space is suitable for storing the gathered information; and
d. reserving space on the storage medium suitable for writing the content of the buffer space;
wherein generating the minidump file further includes initially storing the thread information, the context information, the callstack information, the process information, and the information identifying the reason for generating the minidump file to the buffer space, and then copying the minidump file from the buffer space to the storage medium and further comprising upon re-initialization, after having stored the minidump file to the storage medium, accessing the minidump file on the storage medium and using at least a portion of the minidump file to further understand an exception that was at least one reason for generating the minidump file.

2. The method as recited in claim 1, further comprising determining when to generate the minidump file.

3. The method as recited in claim 1, wherein generating the minidump file further includes gathering processor information about at least one processor.

4. The method as recited in claim 2, wherein determining when to generate the minidump file further includes determining that an exception has occurred.

5. The method as recited in claim 1, wherein the minidump file does not include data stored in global initialized memory.

6. The method as recited in claim 1, wherein the minidump file does not include data stored in uninitialized memory.

7. The method as recited in claim 1, wherein the minidump file does not include executable instructions used by a processor to execute a program.

8. The method as recited in claim 1, wherein the minidump file is a kernel minidump file associated with an operating system and the at least one running is the single thread which encountered an exception.

9. The method as recited in claim 8, wherein the callstack information includes kernel stack information.

10. The method as recited in claim 1, wherein the process information identifies a process that initiated the thread.

11. The method as recited in claim 1, wherein the minidump file is a user minidump file associated with at least one non-operating system program.

12. The method as recited in claim 1, wherein generating the minidump file further includes gathering callstack information for all running threads.

13. The method as recited in claim 12, wherein the callstack information includes a user callstack.

14. The method as recited in claim 1, wherein generating the minidump file further includes gathering processor context information for all running threads.

15. The method as recited in claim 1, wherein generating the minidump file further includes gathering a listing of loaded modules for a faulting application program.

16. The method as recited in claim 1, wherein the minidump file is a directory indexed file that uses relative virtual addresses (RVAs).

17. The method as recited in claim 1, further comprising providing the minidump file to at least one external device.

18. The method as recited in claim 1, upon system re-initialization, transferring the minidump file from the storage medium to at least one external device.

19. The method as recited in claim 1, herein generating the minidump file further includes gathering a list of loaded modules.

20. A computer-readable medium having computer-executable instructions for causing at least one processor to perform acts comprising:
gathering minidump file information that node not including all volatile system memory but does include at least thread information for at least one running thread, context information for the thread, callstack information for the thread, process information for the process which the thread is running, and information identifying a reason comprising one of the following reasons: callstack fault, processor fault, and application program fault, for generating the minidump file;
allocating a buffer space in memory during an initialization process, wherein the buffer space is suitable for storing the minidump file information; and
reserving space on a storage medium drive suitable for writing the contents of the buffer space;
wherein generating the minidump file further including storing the dump file to a storage medium;
wherein generating the minidump file further includes initially storing the thread information, the context information, the callstack information, the process information, and the information identifying the reason for generating the minidump file to the buffer space, and then copying file from the buffer space to the storage medium; and upon reinitialization after having stored the minidump file to the storage medium, accessing the minidump file on the storage medium and using at least a portion of the minidump file to further understand an exception that was at least one reason for generating the minidump file.

21. The computer-readable medium as recited in claim 20, wherein gathering the minidump file information further includes gathering processor information about at least one processor.

22. The computer-readable medium as recited in claim 20, having further computer-executable instructions for causing the at least one processor to perform acts comprising determining when to generate the minidump file.

23. The computer-readable medium as recited in claim 20, wherein the minidump file does not include data stored in global initialized memory.

24. The computer-readable medium as recited in claim 20, wherein the minidump file does not include data stored in uninitialized memory.

25. The computer-readable medium as recited claim 23 wherein the minidump file does not include executable instructions used by the at least one processor to execute a program.

26. The computer-readable medium as recited in claim 23, wherein the minidump file is a kernel minidump file associated with an operating system and the at least one running thread is the single thread which encountered an exception.

27. The computer-readable medium as recited in claim 20, wherein the callstack information includes kernel stack information.

28. The computer-readable medium as recited in claim 20, wherein the process information identifies a process that initiated the thread.

29. The computer-readable medium as recited in claim 20, wherein the minidump file is a user minidump file associated with at least one non-operating system program.

30. The computer-readable medium as recited in claim 20, wherein gathering the minidump file information further includes gathering callstack information for all running threads.

31. The computer-readable medium as recited in claim 30, wherein the callstack information includes a user callstack.

32. The computer-readable medium as recited in claim 20, wherein gathering the minidump file information further includes gathering processor context information for all running threads.

33. The computer-readable medium as recited in claim 20, wherein gathering the minidump file information further includes gathering a listing of all loaded modules for the faulting application program.

34. The computer-readable medium as recited in claim 20, wherein the minidump file is a directory indexed file that uses relative virtual addresses (RVAs).

35. The computer-readable medium as recited in claim 20, having further computer-executable instructions for causing the at least one processor to perform acts comprising providing the minidump file to at least one external device.

36. The computer-readable medium as recited in claim 20, having further computer-executable instructions for causing the at least one processor to perform acts comprising, upon system re-initialization, transferring the minidump file from the storage medium to at least one external device.

37. The computer-readable medium as recited in claim 20, wherein gathering the minidump file information further includes gathering a list of loaded modules.

38. An apparatus comprising:
memory;
a data storage drive configured to write data files to at least one data storage medium;
at least one processor operatively coupled to the memory and the data storage drive and configured to:
  a. generating a minidump file that does not include all volatile system memory containing at least:
    i. thread information for at least one running thread,
    ii. context information for the thread,
    iii. callstack information for the thread,
    iv. process information for the process in which the thread is running; and
    v. information identifying a reason comprising one of the following reasons: callstack fault, processor fault, and application program fault, for generating the minidump file, and
  b. store the minidump file to the storage medium;
wherein the at least one processor is further configured to:
  allocating a buffer space in the memory during an initialization process; and reserve space on the storage medium drive suitable for writing the contents of the buffer space.

39. The apparatus as recited in claim 38, wherein the at least one processor is further configured to determine when to generate the minidump file.

40. The apparatus as recited in claim 38, wherein the at least one processor is further configured to gather processor information about the at least one processor and include the processor information in the minidump file.

41. The apparatus as recited in claim 39, wherein the at least one processor is her configured to determining when to generate the minidump file based on an exception.

42. The apparatus as recited in claim 38, wherein the minidump file does not include data stored in global initialized memory.

43. The apparatus as recited in claim 38, wherein the minidump file does not include data stored in uninitialized memory.

44. The apparatus as recited claim 38 wherein the minidump file does not include executable instructions used by the at least one processor to execute a program.

45. The apparatus as recited in claim 38, wherein the minidump file is a kernel minidump file associated with an operating system and the at least one running thread is the single thread which encountered an exception.

46. The apparatus as recited in claim 38, wherein the callstack information includes kernel stack information.

47. The apparatus as recited in claim 38, wherein the process information identifies a process that initiated the thread.

48. The apparatus as recited in claim 38, wherein the minidump file is a user minidump file associated with at least one non-operating system program.

49. The apparatus as recited in claim 38, wherein the at least one processor is further configured to gather callstack information for all running threads as part of the minidump file.

50. The apparatus as recited in claim 49, wherein the callstack information includes a user callstack.

51. The apparatus as recited in claim 38, wherein the at least one processor is configured to gather processor context information for all running threads as part of the minidump file.

52. The apparatus as recited in claim 38, wherein the at least one processor is configured to gather a listing of all loaded modules for a faulting application program as part of the minidump file.

53. The apparatus as recited in claim 38, wherein the minidump file is a directory indexed file that uses relative virtual addresses (RVAs).

54. The apparatus as recited in claim 38, wherein the at least one processor is further configured to provide the minidump file to at least one external device.

55. The apparatus as recited in claim 38, wherein the at least one processor is further configured to, upon system re-initialization, transferring the minidump file from the storage medium to at least one external device.

56. The apparatus as recited in claim 38, wherein the at least one processor is further configured to gather a list of loaded modules as part of the minidump file.

* * * * *

UNITED STATES PATENT AND TRADEMARK OFFICE
CERTIFICATE OF CORRECTION

| | | |
|---|---|---|
| PATENT NO. | : 7,028,056 B1 | Page 1 of 2 |
| APPLICATION NO. | : 09/549814 | |
| DATED | : April 11, 2006 | |
| INVENTOR(S) | : Hendel et al. | |

It is certified that error appears in the above-identified patent and that said Letters Patent is hereby corrected as shown below:

On the title page, in Item (54), in "Title", in column 1, line 1, delete "METHOD" and insert -- METHODS --, therefor.

In column 1, line 1, delete "METHOD" and insert -- METHODS --, therefor.

In column 3, line 61, delete "sytem" and insert -- system --, therefor.

In column 7, line 10, after "116" insert -- is --.

In column 9, line 1, above

---

BOOL
"WINAPI                                                        ",
insert -- The WriteMiniDump API is: --.

In column 11, line 48, in Claim 8, after "running" insert -- thread --.

In column 12, line 9, in Claim 19, delete "herein" and insert -- wherein --, therefor.

In column 12, line 57, in Claim 25, after "recited" insert -- in --.

In column 12, line 57, in Claim 25, after "claim 23" insert -- , --.

In column 12, line 61, in Claim 26, after "claim" delete "23" and insert -- 20 --, therefor.

Signed and Sealed this

Eighteenth Day of May, 2010

David J. Kappos
*Director of the United States Patent and Trademark Office*

CERTIFICATE OF CORRECTION (continued)
U.S. Pat. No. 7,028,056 B1

In column 13, line 58, in Claim 38, after "space" delete "." and insert -- ;
wherein at least one processor is further configured to:
    generate the minidump file by initially storing the thread information, the context information, the callstack information, the process information, and the information identifying the reason for generating the dump file to the buffer space, and then copying the minidump file from the buffer space to the storage;
wherein the at least one processor is further configured to:
    upon re-initialization after having stored the minidump file to the storage medium, access the minidump file on the storage medium and use at least a portion of the minidump file to further understand an exception that was at least one reason for generating the minidump file. --, therefor.

In column 14, line 6, in Claim 41, delete "her" and insert -- further --, therefor.

In column 14, line 15, in Claim 44, after "recited" insert -- in --.

In column 14, line 15, in Claim 44, after "claim 38" insert -- , --.